United States Patent
Harrill

[11] Patent Number: 5,848,559
[45] Date of Patent: Dec. 15, 1998

[54] STEERING WHEEL COVER FOR MASSAGING HANDS OF A DRIVER

[76] Inventor: Bill Harrill, 2524 Woodwynn Dr., Gastonia, N.C. 28054

[21] Appl. No.: 933,425

[22] Filed: Sep. 18, 1997

[51] Int. Cl.$^6$ ........................................... B62D 1/06
[52] U.S. Cl. ................................................. 74/558
[58] Field of Search .................................. 74/558, 558.5, 74/552; 150/154

[56] References Cited

U.S. PATENT DOCUMENTS

| | | | |
|---|---|---|---|
| 5,224,397 | 7/1993 | Yoo | 74/558 |
| 5,327,799 | 7/1994 | Lin | 74/558 |
| 5,743,154 | 4/1998 | Jacinth | 74/558 |

FOREIGN PATENT DOCUMENTS

| | | | |
|---|---|---|---|
| 178078 | 7/1989 | Japan | 74/552 |

*Primary Examiner*—Charles A. Marmor
*Assistant Examiner*—Mary Ann Battista

[57] ABSTRACT

A steering wheel cover for massaging hands of a driver is provided including a tubular body formed of an elastomeric material and positioned on a steering wheel. A plurality of rigid wires are sidably situated within a plurality of conduits formed in the tubular body along a length thereof. The wires are in frictional relationship with the tubular body for allowing the vibration thereof upon reciprocation of the wires within the conduits. Further included is a vibration assembly connected to the rigid wires and adapted to effect the reciprocation thereof.

7 Claims, 4 Drawing Sheets

STEERING WHEEL COVER FOR MASSAGING HANDS OF A DRIVER

BACKGROUND OF THE INVENTION

1. Field of the Invention

The present invention relates to steering wheel covers and more particularly pertains to a new steering wheel cover for massaging hands of a driver by way of a plurality of wires situated within a tubular body.

2. Description of the Prior Art

The use of steering wheel covers is known in the prior art. More specifically, steering wheel covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art steering wheel covers include U.S. Pat. No. 5,224,397; U.S. Pat. No. 5,393,298; U.S. Pat. No. 5,213,007; U.S. Pat. No. 5,287,767; U.S. Pat. No. 4,052,982; and U.S. Pat. No. 4,800,776.

In these respects, the steering wheel cover for massaging hands of a driver according to the present invention substantially departs from the conventional concepts and designs of the prior art, and in so doing provides an apparatus primarily developed for the purpose of massaging hands of a driver by way of a plurality of wires situated within a tubular body.

SUMMARY OF THE INVENTION

In view of the foregoing disadvantages inherent in the known types of steering wheel covers now present in the prior art, the present invention provides a new steering wheel cover for massaging hands of a driver construction wherein the same can be utilized for massaging hands of a driver by way of a plurality of wires situated within a tubular body.

The general purpose of the present invention, which will be described subsequently in greater detail, is to provide a new steering wheel cover for massaging hands of a driver apparatus and method which has many of the advantages of the steering wheel covers mentioned heretofore and many novel features that result in a new steering wheel cover for massaging hands of a driver which is not anticipated, rendered obvious, suggested, or even implied by any of the prior art steering wheel covers, either alone or in any combination thereof.

To attain this, the present invention generally comprises a tubular body formed of an elastomeric material. As shown in FIGS. 2–4, the tubular body has a slit formed along an inner circumference thereof defining a pair of free edges. Such free edges are adapted for allowing the releasable coupling of the tubular body on a steering wheel. In the preferred embodiment, a first one of the free edges has a first pile fastener located thereon along an exterior surface of the tubular body. Note FIG. 3. A second one of the free edges has a second pile fastener located thereon along an interior surface of the tubular body. By this structure, the free edges are adapted to overlap thereby maintaining the tubular body on the steering wheel. For gripping purposes, the exterior surface has a plurality of spaced annular protrusions formed thereon in coaxial relationship therewith. As best shown in FIG. 7, the tubular body further has a recess formed in the exterior surface at a central extent thereof with a pair of side walls. Next provided is a plurality of rigid wires slidably situated within a plurality of conduits formed in the tubular body along a length thereof, as shown in FIGS. 2 & 3. Such conduits reside in communication with the side walls of the recess of the tubular body. As such, the wires are in frictional relationship with the tubular body for allowing the vibration thereof upon reciprocating of the wires within the conduits. As shown in FIG. 7, the wires each have an end extending through one of the side walls of the recess of the tubular body. With reference now to FIG. 8, it can be seen that a square plate is included. Such plate is situated within the recess with a pair of side edges coupled to the ends of the wires. In use, the square plate is adapted to be moved in a reciprocating manner within the recess thereby moving the wires. Also included is a vibration assembly having a housing with a rectangular configuration coupled to the tubular body about the recess thereof. As shown in FIG. 6, a first bevel gear is situated within the housing with a rear face eccentrically coupled to a top face of the square plate and a front face rotatably coupled to the housing. A motor is coupled within the housing with a rotor having a second bevel gear coupled thereto and in engagement with the first bevel gear. By this structure, the vibration assembly is adapted for reciprocating the square plate and the wires upon the receipt of power thus vibrating the tubular body. To allow selective actuation of the vibration assembly, a switch is connected between the motor and a fuse box of the vehicle for allowing the supply of power to the motor upon the switching thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new steering wheel cover for massaging hands of a driver apparatus and method which has many of the advantages of the steering wheel covers mentioned heretofore and many novel features that result in a new steering wheel cover for massaging hands of a driver which is not anticipated, rendered obvious, suggested, or even implied by any of the prior art steering wheel covers, either alone or in any combination thereof.

It is another object of the present invention to provide a new steering wheel cover for massaging hands of a driver which may be easily and efficiently manufactured and marketed.

It is a further object of the present invention to provide a new steering wheel cover for massaging hands of a driver which is of a durable and reliable construction.

An even further object of the present invention is to provide a new steering wheel cover for massaging hands of a driver which is susceptible of a low cost of manufacture with regard to both materials and labor, and which accordingly is then susceptible of low prices of sale to the consuming public, thereby making such steering wheel cover for massaging hands of a driver economically available to the buying public.

Still yet another object of the present invention is to provide a new steering wheel cover for massaging hands of a driver which provides in the apparatuses and methods of the prior art some of the advantages thereof, while simultaneously overcoming some of the disadvantages normally associated therewith.

Still another object of the present invention is to provide a new steering wheel cover for massaging hands of a driver by way of a plurality of wires situated within a tubular body.

Even still another object of the present invention is to provide a new steering wheel cover for massaging hands of a driver that includes a tubular body formed of an elastomeric material and positioned on a steering wheel. A plurality of rigid wires are slidably situated within a plurality of conduits formed in the tubular body along a length thereof. The wires are in frictional relationship with the tubular body for allowing the vibration thereof upon reciprocation of the wires within the conduits. Further included is a vibration assembly connected to the rigid wires and adapted to effect the reciprocation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
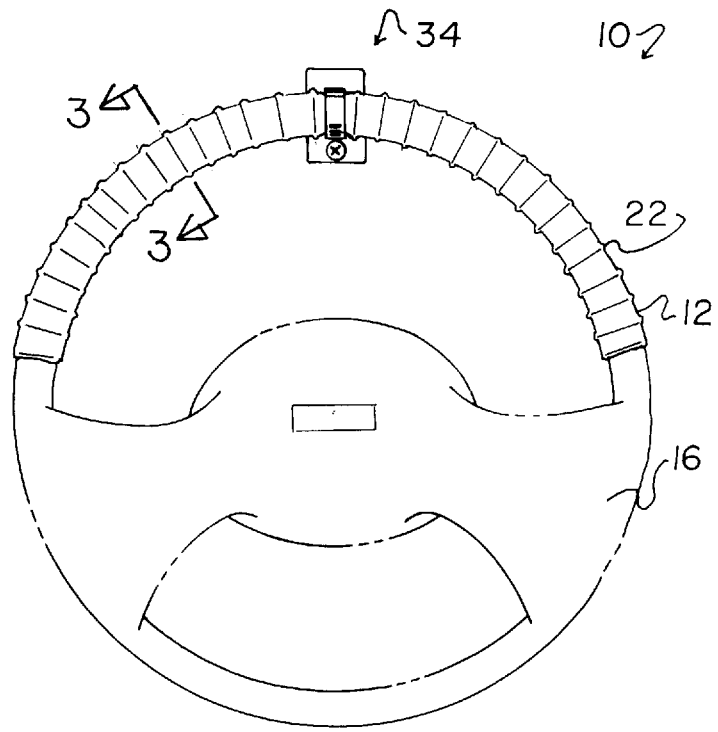
FIG. 1 is a front view of a new steering wheel cover for massaging hands of a driver according to the present invention.

With reference now to the drawings, a new steering wheel cover for massaging hands of a driver embodying the principles and concepts of the present invention and generally designated by the reference numeral 10 will be described.

Figure 2:
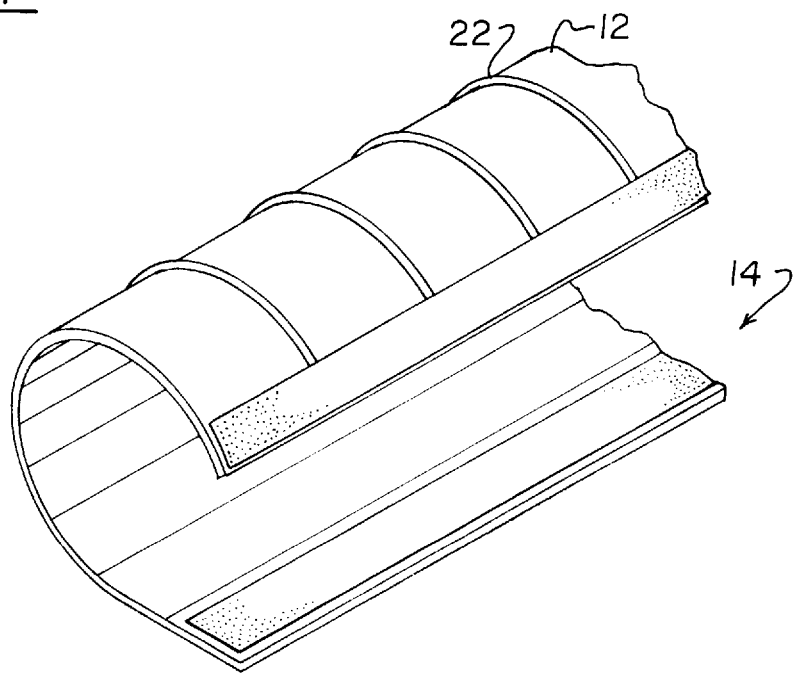
FIG. 2 is a perspective view of the tubular body of the present invention.
Figure 3:
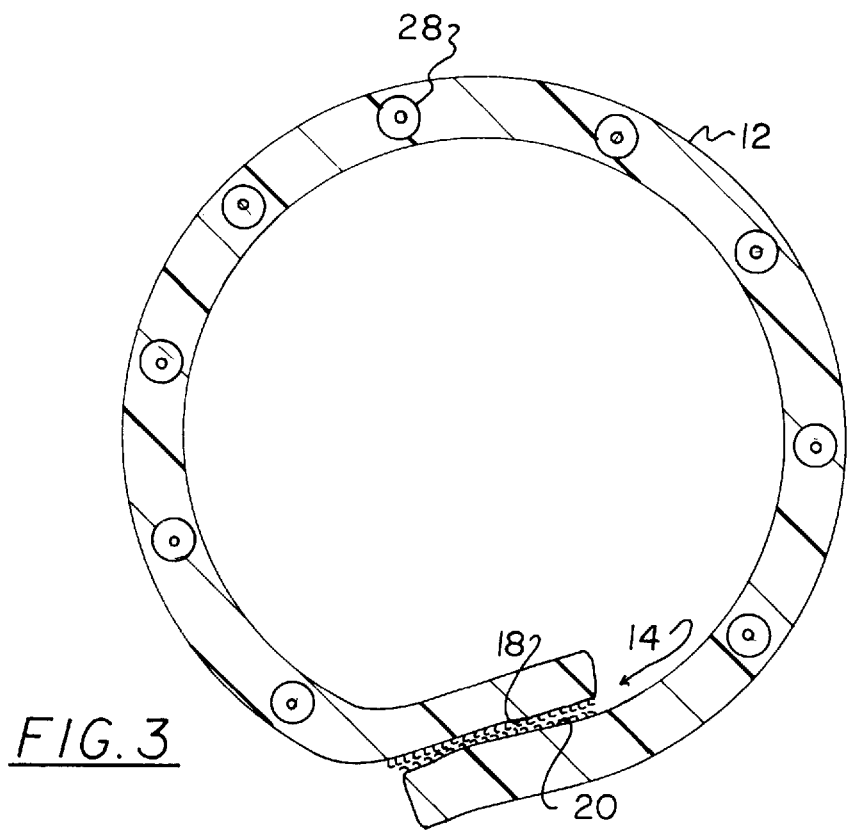
FIG. 3 is a cross-sectional view of the preferred embodiment of the present invention.
Figure 4:
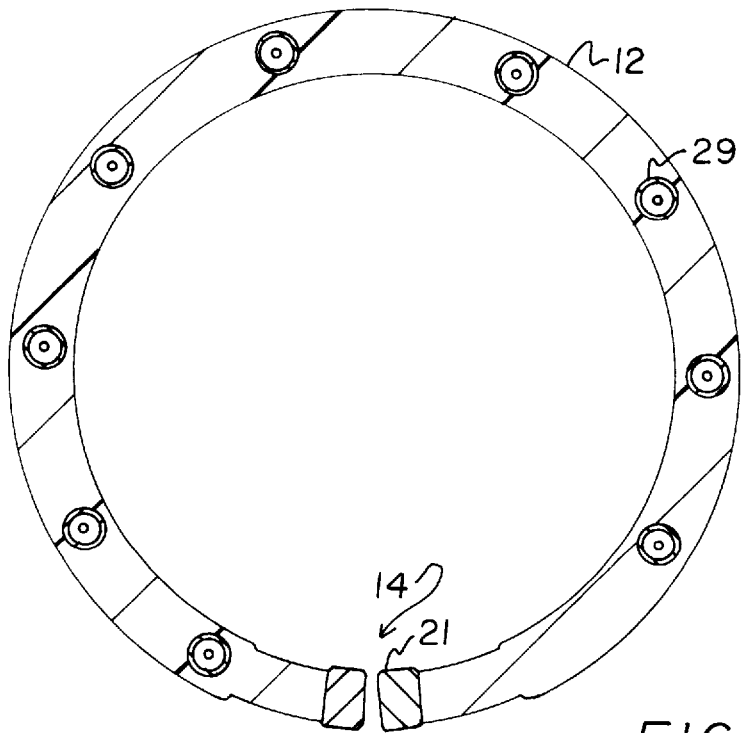
FIG. 4 is a cross-sectional view an alternate embodiment of the present invention.

Specifically, the system 10 of the present invention includes a tubular body 12 formed of a flexible elastomeric material. As shown in FIGS. 2–4, the tubular body has a slit 14 formed along an inner circumference thereof defining a pair of free edges. Such free edges are adapted for allowing the releasable coupling of the tubular body on a steering wheel 16. In the preferred embodiment, a first one of the free edges has a first pile fastener 18 located thereon along an exterior surface of the tubular body. Note FIG. 3. A second one of the free edges has a second pile fastener 20 located thereon along an interior surface of the tubular body. By this structure, the free edges are adapted to overlap thereby maintaining the tubular body on the steering wheel. In alternate embodiments, zippers 21 or adhesive may be utilized to couple the free edges.

Figure 7:
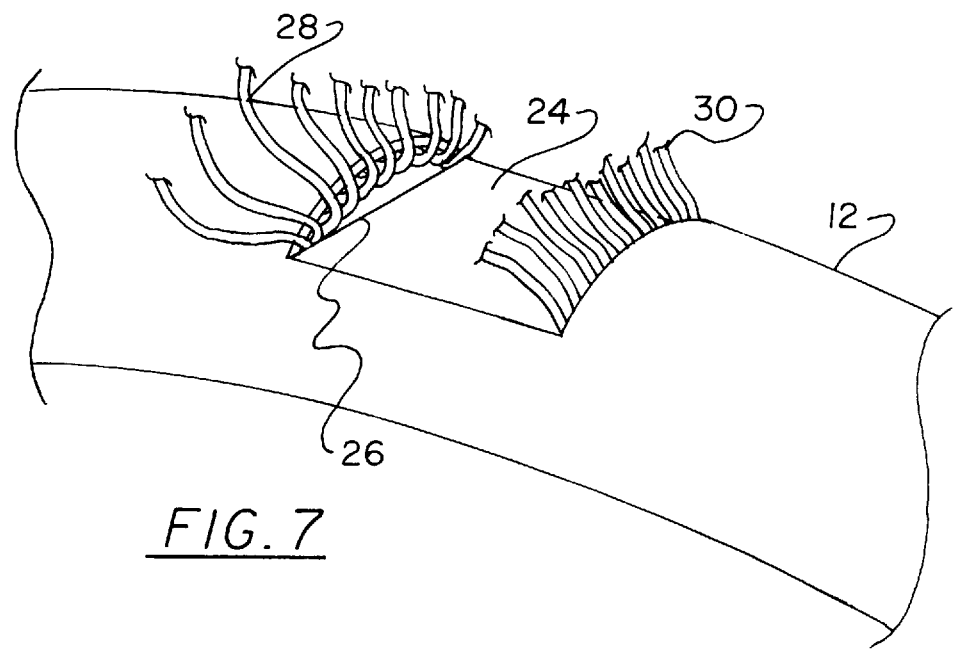
FIG. 7 is a perspective view of the tubular body of a position at which the vibration assembly attached.

For gripping purposes, the exterior surface is textured in that it has a plurality of spaced annular protrusions 22 formed thereon in coaxial relationship therewith. In the alternative, various other types of texture may be employed. Also, it should be noted that the exterior surface of the tubular body may be smooth. As best shown in FIG. 7, the tubular body further has a square recess 24 formed in the exterior surface at a central extent thereof and situated opposite the free edges. The recess is further equipped with a pair of side walls 26. The depth of the recess is preferably equal to the thickness of the tubular body.

Next provided is a plurality of rigid wires 28 slidably situated within a plurality of conduits formed in the tubular body along a length thereof, as shown in FIGS. 2 & 3. Such conduits reside in communication with the side walls of the recess of the tubular body. While not shown, it should be noted that the conduits that are located adjacent the free edges are angled toward the side walls of the recesses for reasons that will become apparent hereinafter. It is imperative that the wires reside in frictional relationship with the tubular body for allowing the vibration thereof upon reciprocation of the wires within the conduits. Such frictional relationship may be enhanced by covering the wires with an elastomeric sheath 29. As shown in FIG. 7, the wires each have an end 30 extending through one of the side walls of the recess of the tubular body.

Figure 8:
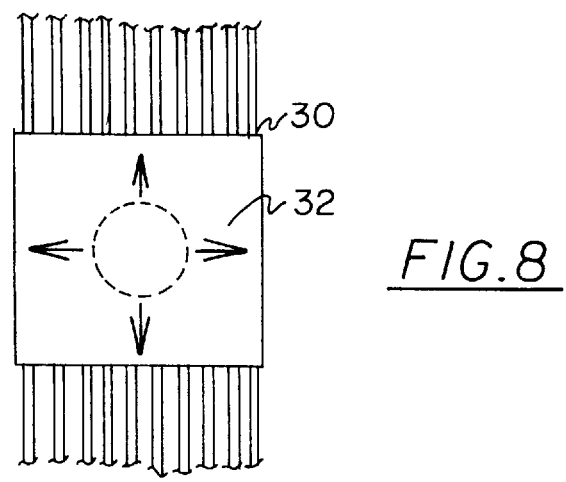
FIG. 8 is a top view of the wires and square plate of the present invention.

With reference now to FIG. 8, it can be seen that a square plate 32 is included. Such plate is situated within the recess with a pair of side edges coupled to the ends of the wires. In use, the square plate is adapted to be moved in a reciprocating manner within the recess thereby moving the wires.

Figures 5, 6:
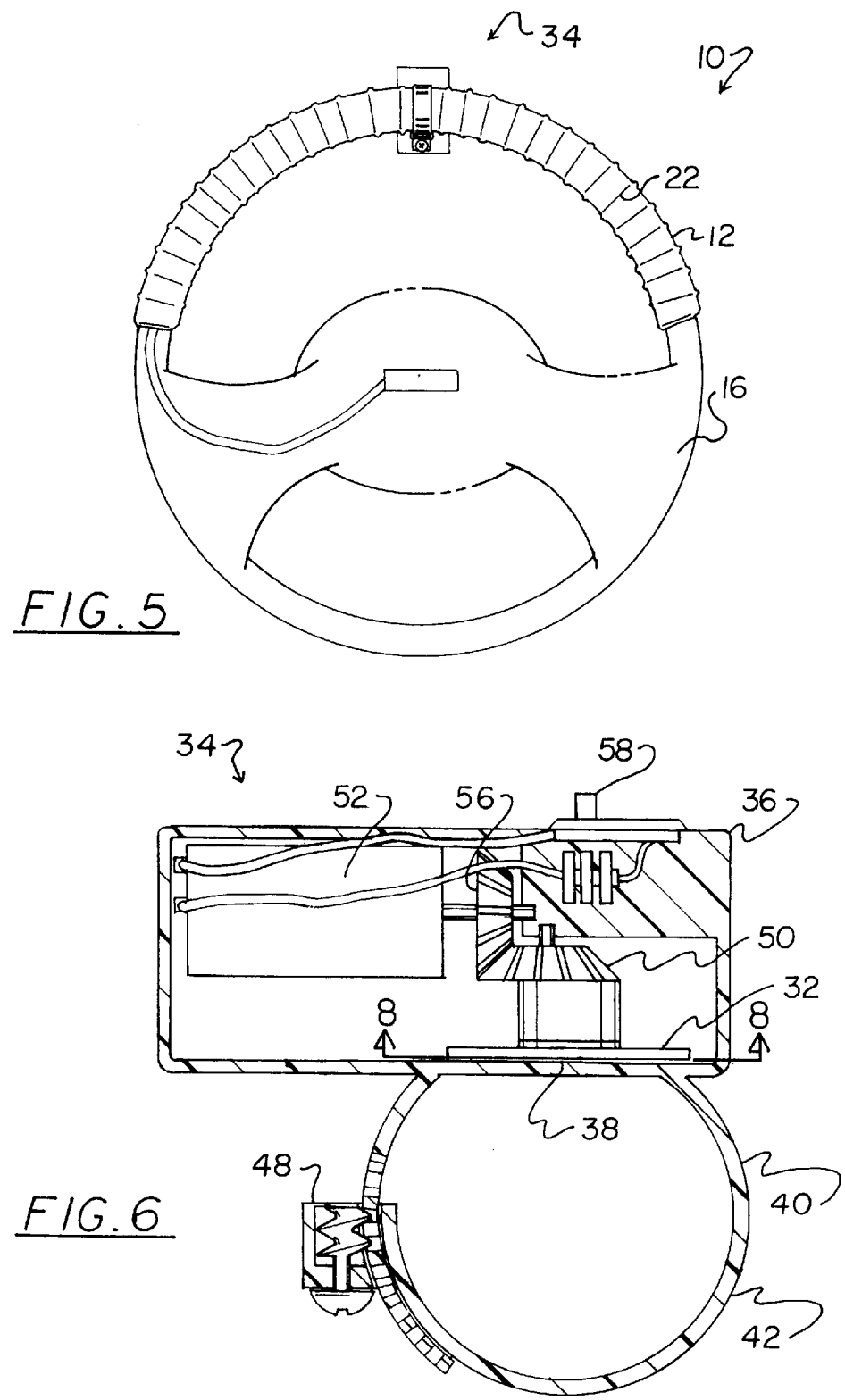
FIG. 5 is yet another front view of the present invention.
FIG. 6 is a cross-sectional view of the vibration assembly of the present invention.

Also included is a vibration assembly 34 having a housing 36 with a rectangular configuration coupled to the tubular body about the recess thereof. The housing suitably has a pair side slits 38 for allowing the passage of the wires therethrough. As shown in FIG. 6, a majority of the housing extends rearward from the tubular body and steering wheel so as to not interfere with the driver. While the housing may be integrally coupled to the tubular body, a clamp 40 may also be incorporated as an option to facilitate the coupling thereof. As shown in FIG. 6, the clamp may include a pair of flexible tabs 42 that are coupled to the housing and encompass the tubular body. The tabs may be tightened about the tubular body by way of a screw and strip combination 48.

As shown in FIG. 6, a first bevel gear 50 is situated within the housing with a rear face eccentrically coupled to a top face of the square plate and a front face rotatably coupled to the housing. A motor 52 is coupled within the housing with a rotor having a second bevel gear 56 coupled thereto and in engagement with the first bevel gear. By this structure, the vibration assembly is adapted for reciprocating the square plate and the wires upon the receipt of power thus vibrating the tubular body. To allow selective actuation of the vibration assembly, a push button switch 58 is connected between the motor and a fuse box of the vehicle for allowing the supply of power to the motor upon the depression thereof. As shown in FIG. 6, the push button is positioned on the top face of the housing.

In a first embodiment, the tubular body covers the entire steering wheel and comprises only one vibration assembly. Alternatively, a plurality of tubular bodies cover portions of the steering wheel and each comprise a separate vibration assembly. In yet another alternate embodiment, the tubular body may be integrally formed with the steering wheel thus affording a unitary device. Further, the vibration assembly may be incorporated within the tubular body and steering wheel. Such embodiment would be ideally tailored as a vehicular option incorporated at the time of manufacture. It should further be noted that the vibration assembly may be battery powered by way of a small battery or a plurality of watch batteries. The employment of batteries would obviate the need for any wires to be connected to the fuse box.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A steering wheel cover for massaging hands of a driver comprising, in combination:

a tubular body formed of an elastomeric material and having a slit formed along an inner circumference thereof defining a pair of free edges for allowing the releasable coupling of the tubular body on a steering wheel, a first one of the free edges having a first pile fastener located thereon along an exterior surface of the tubular body and a second one of the free edges having a second pile fastener located thereon along an interior surface of the tubular body whereby the free edges are adapted to overlap thereby maintaining the tubular body on the steering wheel, the exterior surface having a plurality of spaced annular protrusions formed thereon in coaxial relationship therewith for gripping purposes, the tubular body further having a recess formed in the exterior surface at a central extent thereof with a pair of side walls;

a plurality of rigid wires slidably situated within a plurality of conduits formed in the tubular body along a length thereof and in communication with the side walls of the recess of the tubular body, whereby the wires are in frictional relationship with the tubular body for allowing the vibration thereof upon reciprocating of the wires within the conduits, the wires each having an end extending through one of the side walls of the recess of the tubular body;

a square plate situated within the recess with a pair of side edges coupled to the ends of the wires, the square plate adapted to be moved within the recess thereby moving the wires; and a vibration assembly having a housing with a rectangular configuration coupled to the tubular body about the recess thereof, a first bevel gear situated within the housing with a rear face eccentrically coupled to a top face of the square plate and a front face rotatably coupled to the housing, a motor coupled within the housing with a rotor having a second bevel gear coupled thereto and in engagement with the first bevel gear for reciprocating the square plate and the wires upon the receipt of power thus vibrating the tubular body, and a switch connected between the motor and a fuse box of the vehicle for allowing the supply of power to the motor upon the switching thereof.

2. A steering wheel cover for massaging hands of a driver comprising:

a tubular body formed of an elastomeric material and positioned on a steering wheel a plurality of rigid wires slidably situated within a plurality of conduits formed in the tubular body along a length thereof, whereby the wires are in frictional relationship with the tubular body for allowing the vibration thereof upon reciprocating of the wires within the conduits; and a vibration assembly connected to the rigid wires and adapted to effect the reciprocation thereof.

3. A steering wheel cover for massaging hands of a driver as set forth in claim 2 wherein the tubular body has a slit formed along an inner circumference thereof defining a pair of free edges for allowing the releasable coupling of the tubular body on a steering wheel, a first one of the free edges having a first coupling means and a second one of the free edges having a second coupling means whereby the free edges are adapted to be coupled by way of the coupling means thereby maintaining the tubular body on the steering wheel.

4. A steering wheel cover for massaging hands of a driver as set forth in claim 3 wherein the first and second coupling means are pile fasteners.

5. A steering wheel cover for massaging hands of a driver as set forth in claim 3 wherein the first and second coupling means are zippers.

6. A steering wheel cover for massaging hands of a driver as set forth in claim 2 wherein the tubular body covers the entire steering wheel and comprises only one vibration assembly.

7. A steering wheel cover for massaging hands of a driver as set forth in claim 2 wherein a plurality of tubular bodies cover portions of the steering wheel and each comprise a separate vibration assembly.

* * * * *